3,012,055
ALKYL ORTHOPHOSPHATE SALTS OF
COPOLYMER AMINES
Ernest L. Pollitzer, Hinsdale, Ill., assignor to Universal Oil Products Company, Des Plaines, Ill., a corporation of Delaware
No Drawing. Filed July 13, 1960, Ser. No. 42,507
6 Claims. (Cl. 260—461)

This is a continuation-in-part of my copending application Serial No. 753,880, filed August 8, 1958, and relates to a novel composition of matter. The novel composition is particularly useful in the stabilization of organic compounds and more particularly to a novel method of preventing deterioration thereof in storage, transportation and/or use. The present invention is particularly applicable to the stabilization of hydrocarbon oils including gasoline, naphtha, jet fuel, kerosene, diesel oil, gas oil, heater oil, burner oil, range oil, fuel oil, residual oil, lubricating oil, marine oil, transformer oil, hydraulic oil, slushing oil, etc. During transportation and storage these oils tend to deteriorate with the resultant undesirable discoloration or formation of sediment. This deterioration appears to be accelerated when the oil is heated to an elevated temperature. The present invention provides a novel method of preventing such deterioration.

While the present invention is particularly applicable for the stabilization of hydrocarbon oil and still more particularly hydrocarbon oils heavier than gasoline, it also may be used for the stabilization of other organic compounds which undergo deterioration in storage, transportation use or heating. These organic compounds include alcohols, ketones, ethers, acids, esters, glycerides, chlorinated hydrocarbons, detergents, pharmaceuticals, organic intermediates, etc. In another embodiment, the additive of the present invention may be used in the stabilization of petroleum greases, synthetic greases, plastic, rubber, cutting oils, rolling oils, soluble oils, etc.

In one embodiment the present invention relates to a process for stabilizing an organic substance normally tending to undergo deterioration which comprises incorporating therein a stabilizing concentration of an oil soluble alkyl acid phosphate salt of a copolymer containing in combined form as its essential monomeric components copolymerizable (1) unsaturated compound having a polymerizable ethylenic linkage and (2) an unsaturated compound having a polymerizable ethylenic linkage and a basic amino nitrogen, said copolymer containing an aliphatic hydrocarbon side chain of from about 8 to about 18 carbon atoms and said copolymer containing a total of from about 0.1% to about 3.5% by weight of basic amino nitrogen.

In a specific embodiment the present invention relates to a method of stabilizing jet fuel which comprises incorporating therein from about 0.001% to about 1% by weight of oil soluble mixed mono- and diisooctyl acid orthophosphate salts of a copolymer of lauryl methacrylate and beta-diethyl-aminoethyl methacrylate, said copolymer containing from about 0.1% to about 3.5% of basic amino nitrogen.

In another embodiment the present invention relates to an organic substrate and particularly hydrocarbon oil containing a stabilizing concentration of the additive herein set forth.

The salts of the present application are believed to be novel compositions of matter and, accordingly, are being so claimed herein.

In order to be effective in preventing sediment formation, discoloration and other deterioration of hydrocarbon oils, the copolymer must meet certain requirements. It is formed by the addition type copolymerization of two different polymerizable compounds. One of these compounds is amine-free. The other compound must contain a basic amino nitrogen structure. At least one of these compounds must contain from about 8 to about 18 carbon atoms in an aliphatic hydrocarbon side chain. The side chain is not part of the main polymer chain. The copolymer contains from about 0.1% to about 3.5% by weight of basic amino nitrogen and preferably from about 0.2% to about 3% by weight thereof.

Illustrative examples of one of the unsaturated compounds for use in forming the copolymer include saturated and unsaturated long chain esters of unsaturated carboxylic acids such as 2-ethylhexyl acrylate, decyl acrylate, undecyl acrylate, dodecyl acrylate, tridecyl acrylate, tetradecyl acrylate, pentadecyl acrylate, hexadecyl acrylate, heptadecyl acrylate, octadecyl acrylate, and particularly methacrylates including n-octyl methacrylate, n-nonyl methacrylate, 3,5,5-trimethylhexyl methacrylate, n-decyl methacrylate, sec-capryl methacrylate, lauryl methacrylate, dodecyl methacrylate, tridecyl methacrylate, tetradecyl methacrylate, pentadecyl methacrylate, hexadecyl methacrylate, cetyl methacrylate, heptadecyl methacrylate, octadecyl methacrylate, 9-octadecenyl methacrylate, etc.; unsaturated esters of long-chain carboxylic acids such as vinyl laurate, vinyl stearate; long-chain esters of vinylene dicarboxylic acids such as methyl lauryl fumarate; long-chain monoolefins such as the alkyl or acyl substituted styrenes as, for example, dodecylstyrene, and the like. A particularly preferred compound is lauryl methacrylate and more particularly technical lauryl methacrylate which is obtained by esterification of a commercial mixture of long-chain alcohols in the $C_{10}$ to $C_{18}$ range derived from coconut oil. The technical lauryl methacrylate is available commercially at a lower price and, accordingly, is preferred. A typical technical lauryl methacrylate will contain in the ester portion carbon chain lengths of approximately 3% $C_{10}$, 61% $C_{12}$, 23% $C_{14}$, 11% $C_{16}$, and 2% $C_{18}$.

The other compound used in the polymerization is a basic amino nitrogen-containing compound, and illustrative examples include the basic amino substituted olefins such as p-(beta-diethylaminoethyl)-styrene; basic nitrogen-containing heterocycles carrying a polymerizable ethylenically unsaturated substituent such as the vinyl pyridines and the vinyl alkyl pyridines as, for example, 2-vinyl-5-ethyl pyridine; esters of basic amino alcohols with unsaturated carboxylic acids such as the alkyl and cycloalkyl substituted amino-alkyl and amino cycloalkyl esters of the acrylic and alkacrylic acids as, for example, beta-methylaminoethyl acrylate, beta-diethylaminoethyl methacrylate, 4-diethylaminocylohexyl methacrylate, beta-beta-didodecylamino ethyl acrylate, etc.; unsaturated ethers of basic amino alcohols such as the vinyl ethers of such alcohols as, for example, beta-aminoethyl vinyl ether, beta-diethylaminoethyl vinyl ether, etc.; amides of unsaturated carboxylic acids wherein a basic amino substituent is carried on the amide nitrogen such as N-(beta-dimethylaminoethyl)-acrylamide; polymerizable unsaturated basic amines such as diallylamine, and the like. In this specification and claims the term "basic amino nitrogen" is used in the generic sense to cover the primary, secondary and tertiary amines including, as stated above, the basic nitrogen-containing heterocycles.

In another embodiment, the polymer is derived from the two polymerizable compounds described above and also one or more other polymerizable compounds. The latter compounds do not necessarily contribute towards the inhibiting or dispersing action of the polymer but serve merely as fillers or extenders for the active components. Typical examples of these filler components include the well-known shorter chain ethylenically unsaturated addition polymerizable monomers such as the vinyl and allyl formates, acetates, propionates, butyrates, and the like; polymerizable unsaturated short-chain hydrocarbons such as the monoolefins as, for example, ethylene, propylene, isobutylene, etc., styrene, vinyltoluene, and the like, and the short-chain dienes such as 1,3-butadiene, isoprene, etc.; unsaturated short-chain carboxylic acids and their derivatives such as the alpha-methylene carboxylic acids and their derivatives as, for example, acrylic acid, methyl methacrylate, acrylonitrile, methacrylamide, etc.; the short-chain unsaturated ethers particularly the vinyl and allyl ethers as, for example, ethyl vinyl ether, butyl vinyl ether, allyl glycidyl ether, etc. These and other familiar monomers that are available at moderate cost can be employed for this purpose in proportions ranging up to as much as 79% by weight, in representative polymers, although it is preferred they should not exceed about 65% by weight of the polymer. In addition, inclusion of minor proportions of N-hydrocarbon-substituted amides of unsaturated carboxylic acids may be found beneficial. Especially suitable as polymerizable components of the polymer are the N-hydrocarbon-substituted acrylamides including N-tertiary-butylacrylamide, N-tertiary-octylacrylamide and, particularly, the N-arylacrylamides such as methacrylanilide and acrylanilide.

As hereinbefore set forth, the copolymer contains from about 0.1% to about 3.5% by weight of basic amino nitrogen. This is controlled by the concentration of basic amino nitrogen component used in the copolymerization. Thus, the concentration of amine containing compound generally will be less than one mol per mol of amine-free compound, the specific concentration depending upon the particular amine-containing and amine-free compound or compounds used in the polymerization. A particularly preferred concentration is from about 0.6 to about 0.9 mol proportions of amine-free compound or compounds and about 0.1 to about 0.4 mol proportions of amine-containing compound.

The copolymer is prepared in any suitable manner and, in general, is formed by heating the reactants in a polymerizing reactor at a temperature which usually will be in the range of from about 40° to about 80° C., at pressures ranging from atmospheric to 3000 pounds per square inch or more, and for a time ranging from 2 to 48 hours or more, preferably in the presence of a catalyst or initiator such as benzoyl peroxide, tertiary butyl peroxide, azo compounds as alpha, alpha'-azo-diisobutyronitrile, etc. When desired, the polymerization may be effected in the presence of a solvent. Any suitable solvent may be employed including aromatic hydrocarbons such as benzene, toluene, xylene, ethylbenzene, cumene, etc., paraffinic hydrocarbons including pentane, hexane, heptane, octane, etc., or mixtures including naphtha, kerosene, mineral oil, etc. In some cases the copolymer is to be processed further as a solution in a solvent and conveniently the same solvent is utilized during the polymerization.

As hereinbefore set forth, an alkyl acid phosphate salt of the copolymer prepared in the above manner is utilized as an additive to organic compounds and particularly hydrocarbon distillates. Any suitable alkyl acid phosphate is utilized in preparing the salt and may comprise the alkyl acid orthophosphate and/or the alkyl acid pyrophosphate. In the alkyl acid orthophosphates, the monoalkyl ester, dialkyl ester or a mixture thereof may be employed. In the alkyl acid pyrophosphates, the monoalkyl ester, dialkyl ester, trialkyl ester or mixtures thereof may be employed, the dialkyl ester being preferred and the alkoxy groups may be attached to the same or different phosphorus atoms. Generally, however, this compound will be symmetrical and, thus, the alkoxy groups will be attached to different phosphorus atoms.

Preferably at least one of the alkyl groups constituting the ester contains at least 5 carbon atoms and generally will not exceed about 25 carbon atoms. Illustrative alkyl acid orthophosphates are set forth below, although it is understood that these are presented as preferred examples and that other suitable alkyl acid phosphates may be employed. The preferred alkyl acid orthophosphates include monoamyl acid orthophosphate, diamyl acid orthophosphate, mixture of mono- and diamyl acid orthophosphates, monohexyl acid orthophosphate, dihexyl acid orthophosphate, mixture of mono- and dihexyl acid orthophosphates, monoheptyl acid orthophosphate, diheptyl acid orthophosphate, mixture of mono- and diheptyl acid orthophosphates, monooctyl acid orthophosphate, dioctyl acid orthophosphate, mixture of mono- and dioctyl acid orthophosphates, mononoyl acid orthophosphate, dinonyl acid orthophosphate, mixture of mono- and dinonyl acid orthophosphates, monodecyl acid orthophosphate, didecyl acid orthophosphate, mixture of mono- and didecyl acid orthophosphates, monoundecyl acid orthophosphate, diundecyl acid orthophosphate, mixture of mono- and diundecyl acid orthophosphates, monododecyl acid orthophosphate, didodecyl acid orthophosphate, mixture of mono- and didodecyl acid orthophosphates, monotridecyl acid orthophosphate, ditridecyl acid orthophosphate, mixture of mono- and ditridecyl acid orthophosphates, monotetradecyl acid orthophosphate, ditetradecyl acid orthophosphate, mixture of mono- and ditetradecyl acid orthophosphates, monopentadecyl acid orthophosphate, dipentadecyl acid orthophosphate, mixture of mono- and dipentadecyl acid orthophosphates, etc.

Preferred alkyl acid pyrophosphates include monooctyl acid pyrophosphate, dioctyl acid pyrophosphate, mixture of mono- and dioctyl acid pyrophosphates, mononoyl acid pyrophosphate, dinonyl acid pyrophosphate, mixture of mono- and dinonyl acid pyrophosphates, monodecyl acid pyrophosphates, didecyl acid pyrophosphate, mixture of mono- and didecyl acid pyrophosphates, monoundecyl acid pyrophosphate, diundecyl acid pyrophosphate, mixture of mono- and diundecyl acid pyrophosphates, monododecyl acid pyrophosphate, didodecyl acid pyrophosphate, mixture of mono- and didodecyl acid pyrophosphates, monotridecyl acid pyrophosphate, ditridecyl acid pyrophosphate, mixture of mono- and ditridecyl acid pyrophosphates, monotetradecyl acid pyrophosphate, ditetradecyl acid pyrophosphate, mixture of mono- and ditetradecyl acid pyrophosphates, monopentadecyl acid pyrophosphate, dipentadecyl acid pyrophosphate, mixture of mono- and dipentadecyl acid pyrophosphates, etc.

Conveniently, alkyl groups containing more than 8 carbon atoms are introduced through the use of fatty alcohols and thus the alkyl radicals may be selected from capryl, lauryl, myristyl, palmityl, stearyl, ceryl, etc. Illustrative phosphates in this class include stearyl capryl acid orthophosphate, distearyl acid orthophosphate, dicapryl acid orthophosphate, etc. In other examples, one of the alkyl groups contains less than 8 carbon atoms while the second alkyl group contains more than 8 carbon atoms, and such examples are illustrated by ethyl lauryl acid orthophosphate, ethyl stearyl acid orthophosphate, hexyl lauryl acid orthophosphate, hexyl capryl acid orthophosphate, hexyl stearyl acid orthophosphate, etc.

Alkyl acid phosphates including both the ortho and pyrophosphates also are manufactured commercially as a mixture of mono- and dialkyl acid phosphates and are available at lower costs. In many cases, such mixtures are suitable for use in preparing the salt and such use, therefore, is preferred for economic reasons.

In a preferred embodiment, the alkyl acid phosphate is utilized in a concentration sufficient to completely neutralize the copolymer formed in the manner hereinbefore set forth. In this embodiment the phosphate will be used in a proportion equivalent to the basic amino nitrogen in the copolymer. However, in another embodiment, the phosphate may be used in a concentration to neutralize only a part of the basic amino nitrogens in the copolymer and preferably will neutralize at least 5% of the basic amino nitrogen. Accordingly, the phosphate will be used in a proportion of from about 5 to about 100 mols thereof per 100 mols of basic amino nitrogen in the copolymer.

The salt may be prepared in any suitable manner and, in general, is prepared by admixing the copolymer and alkyl acid phosphate, preferably with stirring. While the reaction may be effected at ambient temperature, it is preferred to utilize slightly elevated temperature which usually will not exceed about 200° F. Excessive temperatures must not be used in order to avoid decomposition reactions. The reaction may be effected in the presence or absence of a solvent. When employed, the solvent may be used either in forming a more fluid mixture of the reactants before mixing and/or during the mixing thereof. Any suitable solvent may be employed and preferably is an aromatic hydrocarbon including benzene, toluene, xylene, ethylbenzene, cumene, etc. or mixtures thereof. In other cases the solvent may be selected from alcohols, ethers, ketones, etc. In many cases it is desired to market the salt as a solution in a suitable solvent and conveniently the same solvent is used during manufacture of the salt as desired in the final product. When the solvent is not to be retained in the final product, the solvent may be removed in any suitable manner such as distillation under vacuum, etc.

The concentration of the salt to be incorporated in the organic compound will depend upon the particular use. In general the salt will be used in a concentration of from about 0.0001% to about 5% by weight or more and usually in a concentration of from about 0.001% to about 1% by weight of the organic substance. It is understood that the salt is incorporated in the subtrate in any suitable manner and generally is effected with mixing in order to obtain intimate distribution of the additive in the substrate. When the salt is introduced into a flowing stream of oil, mixing is accomplished by turbulence normally encountered therein. When the salt is to be incorporated in a normally solid substrate the substrate may be heated to form a liquid composition and the additive is commingled therewith or the additive may be incorporated in the solid substrate in any other suitable manner. It is understood that the salt of the present invention may be used along with other additives which are incorporated in the organic substance for specific purposes including, for example, metal deactivator, synergist, dye, fuel improver, etc.

The following examples are introduced to illustrate further the novelty and utility of the present invention but not with the intention of unduly limiting the same.

*Example I*

A copolymer comprising 80% by weight of lauryl methacrylate and 20% by weight of diethylaminoethyl methacrylate is prepared by copolymerizing these components in concentrations to yield a product having the above proportions. The polymerization is effected by heating the components at about 60° C. for 18 hours, with vigorous stirring, in the presence of benzoyl peroxide catalyst. The product is recovered as a viscous yellow liquid and, for ease of handling, is prepared as a 60% solution in kerosene.

*Example II*

Mixed mono- and ditridecyl acid orthophosphates of a copolymer prepared as described in Example I was formed as follows: 15 grams of the copolymer solution was commingled with 30 cc. of benzene. 2.70 grams of mixed mono- and ditridecyl acid orthophosphates were mixed with 20 cc. of benzene. The copolymer contained about 7.5 milliequivalents of basic nitrogen and the phosphate was used in a concentration of 7.3 milliequivalents. Accordingly, the phosphate is used in a concentration to neutralize substantially all of the basic nitrogen in the copolymer. The copolymer solution and the phosphate solution then were commingled with stirring, and the mixture was heated to 50° C. and stirred for 30 minutes at this temperature. The mixture then was distilled under vacuum to remove the solvents and to leave 14.26 grams of active ingredient. The active ingredient was recovered as a very sticky, viscous, opaque, dark yellow, semi-solid which becomes fluid at 95° F. and higher. The active ingredient had an index of refraction ($n_D^{20}$) of 1.4908. For ease of handling, a 50% by weight solution of the active ingredient was prepared by mixing the active ingredient with sufficient xylene. The solution is a dark yellow, slightly viscous, clear liquid having an index of refraction ($n_D^{20}$) of 1.4913.

*Example III*

The salt prepared as described in Example II was evaluated as an additive to hydrocarbon oil in a method referred to as the "Erdco Test." In this method heated oil is passed through a filter and the time required to develop a differential pressure across the filter of 25 in. Hg is determined. It is apparent that the longer the time the more effective is the additive. However, with a very effective additive the time to reach a differential pressure across the filter of 25 in. Hg is lengthened beyond reasonable limits that the test is stopped after 300 minutes and the differential pressure at that time is recorded.

The oil used in this example is a commercial J.P.–6 jet fuel. In this test, the preheater was run at a temperature of 400° F. and the filter at a temperature of 500° F.

When evaluated in the above manner, a sample of the jet fuel without additive developed a differential pressure across the filter of 25 in. Hg in 12 minutes. In contrast another sample of this fuel containing 0.01% by weight of the 50% solution (0.005% by weight of active ingredient) of the salt prepared as described in Example II, developed a differential pressure of only 1.6 in. Hg after 300 minutes.

From the above data, it will be seen that the salt of the present invention was effective in preventing filter plugging. Accordingly, the fuel containing this additive is satisfactory for use as a jet fuel, whereas plugging difficulties are encountered in the absence of the additive.

*Example IV*

The additive of this example is the mixed mono- and diisooctyl acid orthophosphate salts of a copolymer prepared in the manner described in Example I. 15 grams of the copolymer (7.5 milliequivalents of basic nitrogen) was formed as a solution in 30 cc. of benzene. 1.95 grams of mono- and diisooctyl acid orthophosphate (7.41 milliequivalents) was prepared as a solution in 20 cc. of benzene. The two solutions were mixed with stirring, heated to 50° C. and further stirred for 30 minutes at this temperature. The mixture then was distilled under vacuum to remove the solvents and to leave 12.54 grams of active ingredient. The active ingredient was recovered as a yellow, viscous, sticky, semi-solid having an index of refraction ($n_D^{20}$) of 1.4896. The active ingredient became fluid at temperatures of about 85° F. and higher. For ease in handling the active ingredient was commingled with sufficient xylene to form a final solution containing 50% by weight of active ingredient. This solution is a dark yellow, slightly viscous liquid, having an index of refraction ($n_D^{20}$) of 1.4928.

*Example V*

The salt prepared in the manner described in Example IV was evaluated in another sample of the jet fuel described in Example III and as therein set forth. 0.01% by weight of the salt soltion (0.005% by weight of active ingredient) prepared as described in Example IV was incorporated in another sample of the J.P.–6 jet fuel and, when evaluated in the Erdco Test, developed a differential pressure of only 0.7 in. Hg after 300 minutes. In contrast, a sample of the same jet fuel, without additive, developed a differential pressure of 25 in. Hg within 12 minutes.

I claim as my invention:

1. An alkyl acid orthophosphate salt of a copolymer of unsaturated compounds, each containing polymerizable ethylenic linkage and selected from a group consisting of acrylic and alkacrylic esters having from about 8 to about 18 carbon atoms in the ester group and one of said compounds being amine-free and the other of said compounds containing a basic amino group, said copolymer containing from about 0.1% to about 3.5% of basic amino nitrogen.

2. An alkyl acid orthophosphate salt of a copolymer of lauryl methacrylate and beta-diethylaminoethyl methacrylate, said copolymer containing from about 0.1% to about 3.5% of basic amino nitrogen.

3. Monoisooctyl acid orthophosphate salt of a copolymer of lauryl methacrylate and beta-diethylaminoethyl methacrylate, said copolymer containing from about 0.1% to about 3.5% of basic amino nitrogen.

4. Mixed mono- and diisooctyl acid orthophosphate salts of a copolymer of lauryl methacrylate and beta-diethylaminoethyl methacrylate, said copolymer containing from about 0.1% to about 3.5% of basic amino nitrogen.

5. Monotridecyl acid orthophosphate salt of a copolymer of lauryl methacrylate and beta-diethylaminoethyl methacrylate, said copolymer containing from about 0.1% to about 3.5% of basic amino nitrogen.

6. Mixed mono- and ditridecyl acid orthophosphate salts of a copolymer of lauryl methacrylate and beta-diethylaminoethyl methacrylate, said copolymer containing from about 0.1% to about 3.5% of basic amino nitrogen.

No references cited.